United States Patent
Anthony et al.

(10) Patent No.: US 6,263,267 B1
(45) Date of Patent: Jul. 17, 2001

(54) TRACTION CONTROL SYSTEM FOR A HYBRID ELECTRIC VEHICLE

(75) Inventors: Joseph William Anthony, Ann Arbor; Ming Lang Kuang, Canton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/567,679

(22) Filed: May 9, 2000

(51) Int. Cl.[7] .................................................. B60L 11/00
(52) U.S. Cl. ............................................. 701/22; 180/65.2
(58) Field of Search .................... 701/22, 101; 180/65.1, 180/65.2, 65.3, 65.8, 165; 318/139

(56) References Cited

U.S. PATENT DOCUMENTS

| | | |
|---|---|---|
| 5,492,192 | 2/1996 | Brooks et al. . |
| 5,707,115 | 1/1998 | Bodie et al. . |
| 5,839,533 | 11/1998 | Mikami et al. . |
| 5,951,614 | 9/1999 | Tabata et al. . |
| 5,954,779 | 9/1999 | Dietzel . |
| 5,984,033 * | 11/1999 | Tamagawa et al. ................ 180/65.2 |
| 6,026,921 * | 2/2000 | Aoyama et al. .................... 180/65.2 |

* cited by examiner

Primary Examiner—William A. Cuchlinski, Jr.
Assistant Examiner—Yonel Beaulieu
(74) Attorney, Agent, or Firm—Mark S. Sparschu

(57) ABSTRACT

An electric motor system for reducing drive wheel torque on a hybrid electric vehicle includes an internal combustion engine, an electric motor, a transmission, and a controller. The internal combustion engine is located in the hybrid electric vehicle and generates an engine torque. The electric motor is coupled to the internal combustion engine and generates and electric motor torque. Both the engine and motor are coupled to the transmission that uses the combined torque from both the engine and motor to generate drive wheel torque on a drive wheel. The vehicle system controller is coupled to the electric motor and senses any traction control events. When a traction control event occurs the controller commands the electric motor to reduce the drive wheel torque by reducing the electric motor torque.

7 Claims, 1 Drawing Sheet

TRACTION CONTROL SYSTEM FOR A HYBRID ELECTRIC VEHICLE

TECHNICAL FIELD

The present invention relates generally to automotive torque control systems and, more particularly, to traction control system for a hybrid electric vehicle.

BACKGROUND ART

Many production vehicles are equipped with traction control. Traction control prevents excessive drive wheel spin and therefore increases the stability and performance of the vehicle without compensation from the driver. Since wheel spin is due to a greater torque being applied to the wheels than the tractive limit of the tires for the given set of road conditions, a traction control event reduces the torque applied to the wheels.

Torque reduction is typically done by applying the brakes to the wheel or wheels that are spinning, as well as reducing the engine torque being applied. The engine torque reduction can be done several ways in a conventional vehicle: spark timing retard, fuel cutoff, and engine throttle. Of these alternatives, engine throttle is the most attractive when considering tailpipe emissions, fuel economy, NVH, and driver feel.

Unfortunately, engine transients, even with optimum AFR and spark timing, are a major contributor to tail pipe emissions due to physical and control time delays. Additionally, the engine must operate at less then an optimum condition during these traction control events. Also, in a conventional vehicle, the torque reduction due to each actuator must be calculated to determine the total torque reduction necessary from the engine. These calculations introduce errors and time to perform tasks may introduce significant wheel torque errors.

The disadvantages associated with this conventional torque control technique have made it apparent that a new technique for traction control for a hybrid electric vehicle is needed. Preferably, the new technique would allow the engine to continue operating at its optimum level during traction control events without negatively affecting tailpipe emissions, NVH or fuel economy.

SUMMARY OF THE INVENTION

It is an object of the invention to provide an improved and reliable means for traction control for a hybrid electric vehicle. Another object of the invention is to allow the engine to continue operating at an optimum level during traction control events.

In accordance with the objects of this invention, a traction control system for a hybrid electric vehicle is provided. In one aspect of the invention, an electric motor system for reducing drive wheel torque on a hybrid electric vehicle includes an internal combustion engine, an electric motor, a transmission, and a controller. The internal combustion engine is located in the hybrid electric vehicle and generates an engine torque. The electric motor is coupled to the internal combustion engine and generates an electric motor torque. Both the engine and motor are coupled to the transmission that uses the combined torque from both the engine and motor to generate drive wheel torque on a drive wheel. The vehicle system controller is coupled to the electric motor and senses any traction control events. When a traction control event occurs the controller commands the electric motor to reduce the drive wheel torque by reducing the electric motor torque.

The present invention achieves an improved and reliable means for traction control for a hybrid electric vehicle. Also, the present invention is advantageous in that it reduces the amount of software code required to implement a traction control strategy.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
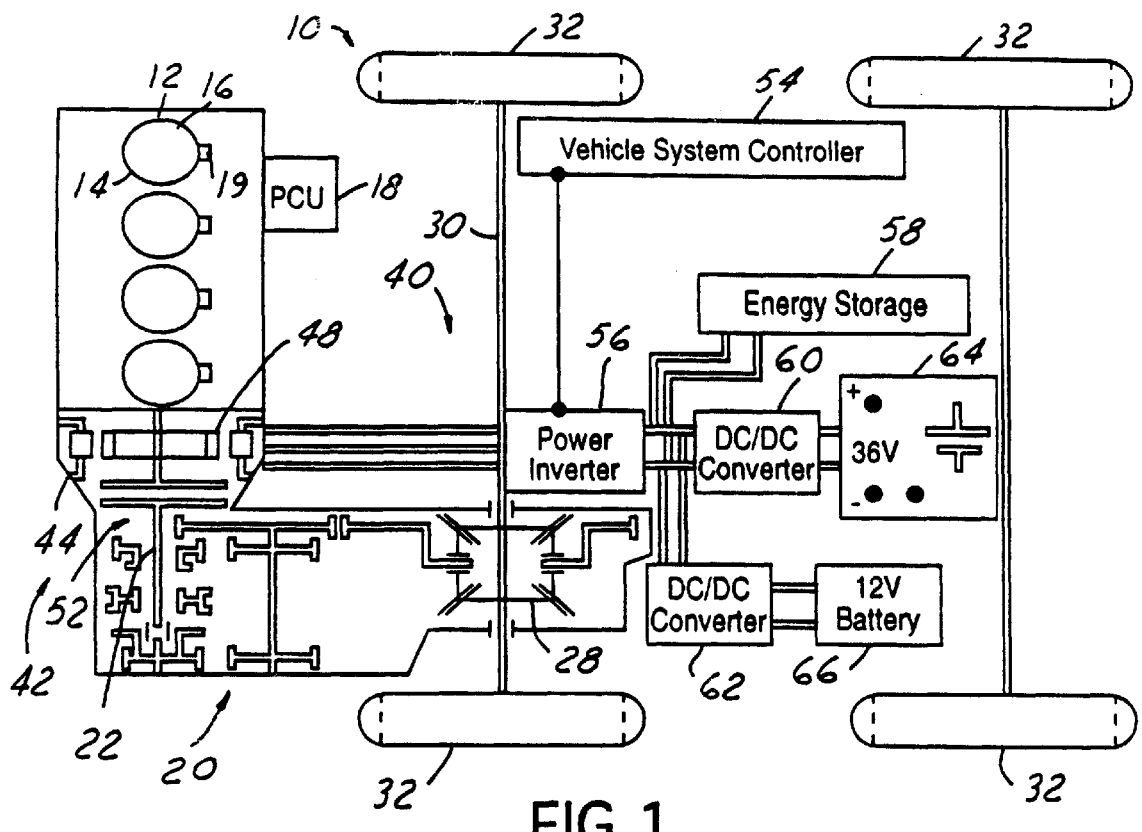
FIG. 1 is a schematic view of a hybrid electric vehicle system having a traction control system in accordance with one embodiment of the present invention.

Referring to FIG. 1, an automotive vehicle 10 is illustrated having an internal combustion engine 12 having cylinders 14 with pistons 16 located therein. Each cylinder 14 is coupled to a fuel pump through a fuel injector (not shown) or other fuel delivery system. Each cylinder 14 also has a spark plug 19 or other ignition source coupled to a powertrain control unit 18. Powertrain control unit 18 controls the ignition timing and fuel pump operation in a conventional manner subject to the improvements of the present invention.

Engine 12 is coupled to a transmission 20. Transmission 20 may be automatic, manual or continuously variable. Transmission 20 has a transaxle input shaft 22. Transmission 20 is coupled to a differential 28 to drive an axle 30 to provide power to wheels 32. Of course, the present invention is also applicable to four wheel drive systems in which all of the wheels 32 are driven.

An electric motor system 40 that includes an electric motor 42 and its associated control electronics is coupled to engine 12. In the present invention, electric motor 42 is positioned between housing 44 of transmission 20 and the engine 12. Electric motor 42 has a stator 46 fixedly attached to bell housing 44 and a rotor 48 selectively coupled to a crankshaft 50 of engine 12 and fixedly coupled to transmission 20. A clutch 52 is used to engage and disengage engine 12 from transmission 20. As will be further described below, electric motor 42 is may be used to produce positive and negative tractive force. Clutch 52 allows electric motor 42 to decouple the engine 12 and transmission 20 during stops or idle of engine 12. While the present invention is an illustration of a Low Storage Requirement HEV, one skilled in the are would recognize that the present teachings are applicable to any parallel or power-split HEV.

Electric motor system 40 has a system controller 54 that is coupled to powertrain control unit 18 and to a power inverter 56. In practice, the power inverter 56 and system controller 54 may be contained in a single package. The inverter 56 is used to convert DC power to AC power in the startup mode and AC power to DC power in power generation mode.

Power inverter 56 may be coupled to an energy storage device 58 such as an ultra capacitor, a first DC to DC converter 60, and a second DC to DC converter 62. In the configuration shown, DC to DC converter 60 is coupled to a 36-volt battery 64. DC to DC converter 62 is coupled to a 12-volt battery 66. Of course, the actual battery voltage, the number of storage devices and the number of DC to DC converters are dependent on the particular system to which it is attached.

Many production vehicles are equipped with traction control. Traction control prevents excessive wheel 32 spin and therefore increases the stability and performance of vehicle 10 without compensation from the driver. Since wheel 32 spin is always due to a greater torque being applied to the wheels 32 than the tractive limit of the tires for the given set of road conditions, a traction control event reduces the torque applied to wheels 32.

In the present invention, vehicle 10 includes an electric motor 48 capable of producing positive and negative tractive force. Electric motor system 40 allow engine 12 to operate at its optimal operating point for the given power requirement. Therefore, any event causing engine 12 to move from this point or changes its operating parameters, such as spark, fuel, egr, etc., will move engine 12 away from an optimum setting. When reducing tractive force, the motor acts as a generator and the energy is stored in battery 64. Electric motor 48 is capable of delivering precise torque and has a very high bandwidth compared to engine 12.

The present invention uses electric motor system 40 to reduce the torque transmitted to drive wheels 32 from engine 12. This will allow engine 12 to operate at the optimum point for fuel economy, emissions and NVH. The energy absorbed by electric motor system 40 will then be stored and used, when required, to meet vehicle 10 performance demands. Because electric motor 48 provides positive and negative torque during normal drive modes, there are no fuel economy, emission, NVH, durability, or cost penalties. In cases where the traction control event duration is exceptionally long or battery 36 cannot accept the power generated by electric motor 48, the throttle position can be reduced in an HEV due to electronic throttle control. Using electric motor 48 should be the first option, however, due to its quicker response time, energy recovery function, and minimal impact on NVH.

Using electric motor system 40 also reduces the amount of code needed to determine how to reduce torque. In a conventional vehicle 10, the torque reduction due to each actuator must be calculated to determine the total torque reduction necessary from engine 12. These calculations introduce errors and time to perform tasks may introduce significant wheel 32 torque errors. Equation (1) describes the calculations necessary to determine wheel 32 torque. Engine 12 torque reduction due to spark, fuel, and throttle position is determined from empirical data maps.

$$T_{e\_red}(sp, \text{fuel}, tp) = \left[\frac{tc\_tq}{GRRAT1 \cdot FDR} - T_e\right] \quad (1)$$

where $T_{e\_red}(sp,\text{fuel},tp)$ is the calculated torque reduction as a function of spark, fuel, and throttle position, $tc\_tq$ is the wheel torque commanded by the traction control module, $T_e$ is the engine torque at the time of the initial traction control event, and FDR is the final drive ratio of transmission 42.

The commanded electric motor 48 torque is given by:

$$T_m = \left[\frac{tc\_tq}{GRRAT1 \cdot FDR} - T_e\right] \quad (2)$$

where $T_m$ is the commanded motor torque. If battery 64 cannot accept all of the power, then the engine 12 torque to be reduced, using the throttle, may be expressed as:

$$T_{e\_red}(tp) = T_{m\_act} - T_m \quad (3)$$

where $T_{m\_act}$ is the actual electric motor 48 torque that can be safely produced by electric motor 48.

From the foregoing, it can be seen that there has been brought to the art a new and improved traction control system for a hybrid electric vehicle. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. An electric motor system to reduce drive wheel torque in a hybrid electric vehicle comprising:

an internal combustion engine located in said hybrid electric vehicle, said internal combustion engine generating an engine torque;

an electric motor located in said hybrid electric vehicle and coupled to said internal combustion engine, said electric motor generating electric motor torque;

a transmission located in said hybrid electric vehicle and coupled to said internal combustion engine and said electric motor, said transmission receiving said engine torque and said electric motor torque, said transmission generating drive wheel torque on a drive wheel; and a vehicle system controller located in said hybrid electric vehicle and coupled to said electric motor, said vehicle system controller including control logic operative to sense a traction control event and reduce said drive wheel torque by reducing said electric motor torque, wherein said electric motor torque during said traction control event is defined by $$T_m = \left[\frac{tc\_tq}{GRRAT1 \cdot FDR} - T_e\right].$$

2. An electric motor system to reduce drive wheel torque in a hybrid electric vehicle comprising:

an internal combustion engine located in said hybrid electric vehicle, said internal combustion engine generating an engine torque;

an electric motor located in said hybrid electric vehicle and coupled to said internal combustion engine, said electric motor generating electric motor torque;

a transmission located in said hybrid electric vehicle and coupled to said internal combustion engine and said electric motor, said transmission receiving said engine torque and said electric motor torque, said transmission generating drive wheel torque on a drive wheel; and a vehicle system controller located in said hybrid electric vehicle and coupled to said electric motor, said vehicle system controller including control logic operative to sense a traction control event and reduce said drive wheel torque by reducing said electric motor torque, wherein said engine torque during said traction control event is defined by $T_{e\_red}(tp)=T_{m\_act}-T_m$.

3. A traction control system comprising:
a hybrid electric vehicle having an electric motor system for reducing torque to a drive wheel, said electric motor system comprising:
an internal combustion engine located in said hybrid electric vehicle, said internal combustion engine generating an engine torque;
an electric motor located in said hybrid electric vehicle and coupled to said internal combustion engine, said electric motor generating electric motor torque;
a transmission located in said hybrid electric vehicle and coupled to said internal combustion engine and said electric motor, said transmission receiving said engine torque and said electric motor torque, said transmission generating drive wheel torque on a drive wheel; and
a vehicle system controller located in said hybrid electric vehicle and coupled to said electric motor, said vehicle system controller including control logic operative to sense a traction control event and reduce said drive wheel torque by reducing said electric motor torque, wherein said electric motor torque during said traction control event is defined by $$T_m = \left[\frac{tc\_tq}{GRRAT1 \cdot FDR} - T_e\right].$$

4. A traction control system comprising:
a hybrid electric vehicle having an electric motor system for reducing torque to a drive wheel, said electric motor system comprising:
an internal combustion engine located in said hybrid electric vehicle, said internal combustion engine generating an engine torque;
an electric motor located in said hybrid electric vehicle and coupled to said internal combustion engine, said electric motor generating electric motor torque;
a transmission located in said hybrid electric vehicle and coupled to said internal combustion engine and said electric motor, said transmission receiving said engine torque and said electric motor torque, said transmission generating drive wheel torque on a drive wheel; and
a vehicle system controller located in said hybrid electric vehicle and coupled to said electric motor, said vehicle system controller including control logic operative to sense a traction control event and reduce said drive wheel torque by reducing said electric motor torque, wherein said engine torque during said traction control event is defined by $T_{e\_red}(tp)=T_{m\_act}-T_m$.

5. A method of reducing torque to a drive wheel for a hybrid electric vehicle, said method comprising the steps of:
generating an engine torque;
generating electric motor torque;
generating drive wheel torque on a drive wheel, said drive wheel torque being approximately the sum of said engine torque and said electric motor torque by a factor of a transmission gear ratio and final drive ratio;
sensing a traction control event; and
reducing said drive wheel torque by reducing said electric motor torque.

6. The method of reducing torque to a drive wheel for a hybrid electric vehicle as recited in claim 5, wherein said electric motor torque is defined as $$T_m = \left[\frac{tc\_tq}{GRRAT1 \cdot FDR} - T_e\right].$$

7. The method of reducing torque to a drive wheel for a hybrid electric vehicle as recited in claim 5, wherein said engine torque is defined as $T_{e\_red}(tP)=T_{m\_act}-T_m$.

* * * * *